United States Patent [19]
Console, deceased Edward E.

[11] 3,754,470
[45] Aug. 28, 1973

[54] CAULIFLOWER CORING AND FLORETING APPARATUS

[75] Inventor: Edward E. Console, deceased, late of Watsonville, Calif. by Edward T. Console, Executor

[73] Assignee: Watsonville Canning & Frozen Food Co., Watsonville, Calif.

[22] Filed: June 15, 1971

[21] Appl. No.: 153,378

[52] U.S. Cl. .................................................. 99/538
[51] Int. Cl. .............................................. A23n 3/12
[58] Field of Search ................ 146/52; 99/538, 544, 99/638, 643

[56] References Cited
UNITED STATES PATENTS

| | | | |
|---|---|---|---|
| 3,612,124 | 10/1971 | Cunningham et al. | 146/52 |
| 3,036,612 | 5/1962 | Wilkerson | 146/52 |
| 3,382,901 | 5/1968 | Pheterson | 146/52 |

Primary Examiner—Willie G. Abercrombie
Attorney—Limbach, Limbach & Sutton

[57] ABSTRACT

Apparatus for simultaneously coring and floreting produce such as cauliflower. Cauliflower being conveyed is engaged alternately by a pair of overhead supported cutting and floreting assemblies disposed on the periphery of a rotating turntable. Each assembly includes a rotating shaft having a coring blade and beaters for breaking the cauliflower into florets.

7 Claims, 8 Drawing Figures

INVENTOR.
EDWARD E. CONSOLE
BY Limbach, Limbach & Sutton
ATTORNEYS

INVENTOR.
EDWARD E. CONSOLE
BY
Limbach, Limbach & Sutton
ATTORNEYS

INVENTOR.
EDWARD E. CONSOLE
BY
Limbach, Limbach & Sutton
ATTORNEYS

CAULIFLOWER CORING AND FLORETING APPARATUS

BACKGROUND OF THE INVENTION

In the processing of produce such as cauliflower, it is necessary to remove the core and to break the cauliflower into chunks or florets suitable for packaging and sale to consumers. Heretofore, processing of cauliflower was a substantially manual operation wherein the stem is cut off and an operator holds the cauliflower head against a water driven rotating blade to remove the core. The cored head is then broken into florets by hand. Besides requiring a substantial time for these manual operations, the use of a driven blade is a safety hazard that results in occasional operator injury even when due care is exercised.

Prior art produce machinery has been primarily directed to processing of fruits wherein a series of complex steps are employed to peel, core, halve, etc. the fruit. The processing of produce such as cauliflower is not particularly adaptable to such machinery. In addition, the requirement to increase efficiency rules out the use of multi-step machinery.

SUMMARY OF THE INVENTION

Cauliflower heads that have had their stems cut off are manually placed, top down, onto holding cups attached to a horizontally moving conveyor belt that moves the cauliflower at a continuous rate toward a cauliflower coring and floreting station. An overhead assembly at the station includes a rotating turntable carrying a pair of cutting and floreting head assemblies having rotating coring knives and beaters to break up the cauliflower into florets. The head assemblies rotate in synchronism with the conveyor belt so as to drop down and engage each succeeding cauliflower head. The turntable rotation speed is varied by slowing it to permit a head assembly to track each head as it passes the cutting and floreting station and by speeding it up to move the other head assembly to move rapidly into position for tracking the next cauliflower head. By combining the coring blade and beater arms on the same rotating shaft in each head assembly the cauliflower is cored and floreted in a single stroke operation thus greatly simplifying the machinery and increasing efficiency.

Variable speed drive of the head assembly carrying turntable is achieved by a cam arrangement: the motor that drives the conveyor belt also drives a pulley connected to a rocker arm, one end of which follows an irregular cam race. The other end of the arm is linked to the turntable drive shaft. Thus the turntable and drive shaft are driven in synchronism and by sizing components congruence of the head assemblies and cauliflower carrying cups on the conveyor can be achieved. A planetary gear arrangement maintains vertical orientation of the head assemblies as the turntable rotates. The head assembly rotating shafts are driven by an independent motor and drive arrangement that is unaffected by rotation of the turntable.

DESCRIPTION OF THE PREFERRED EMBODIMENT

Figure 2:
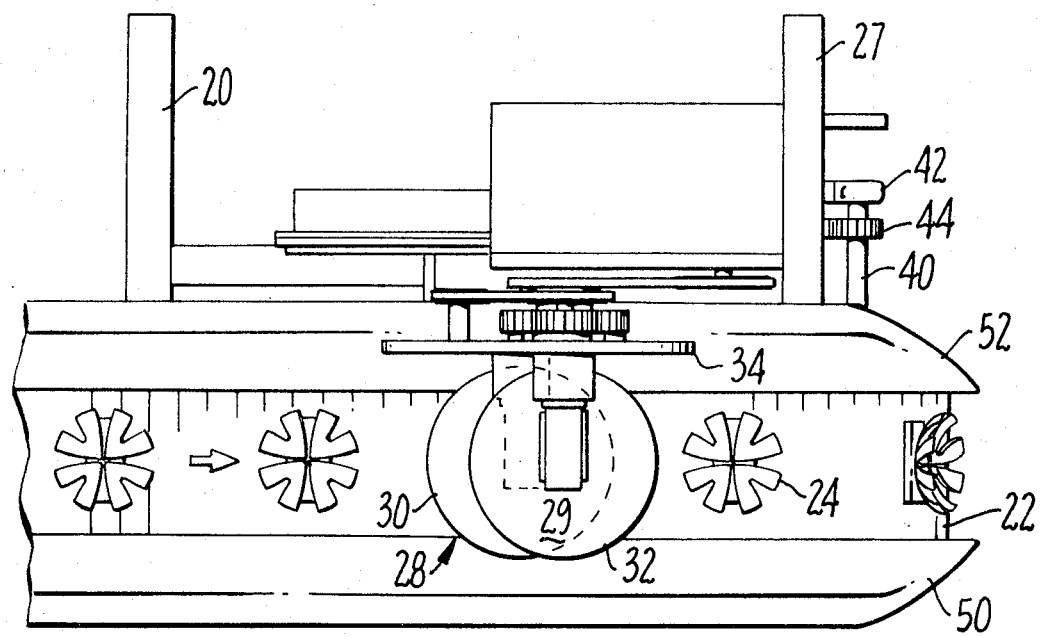
FIG. 2 is a plan view of the apparatus of FIG. 1.
Figure 1:
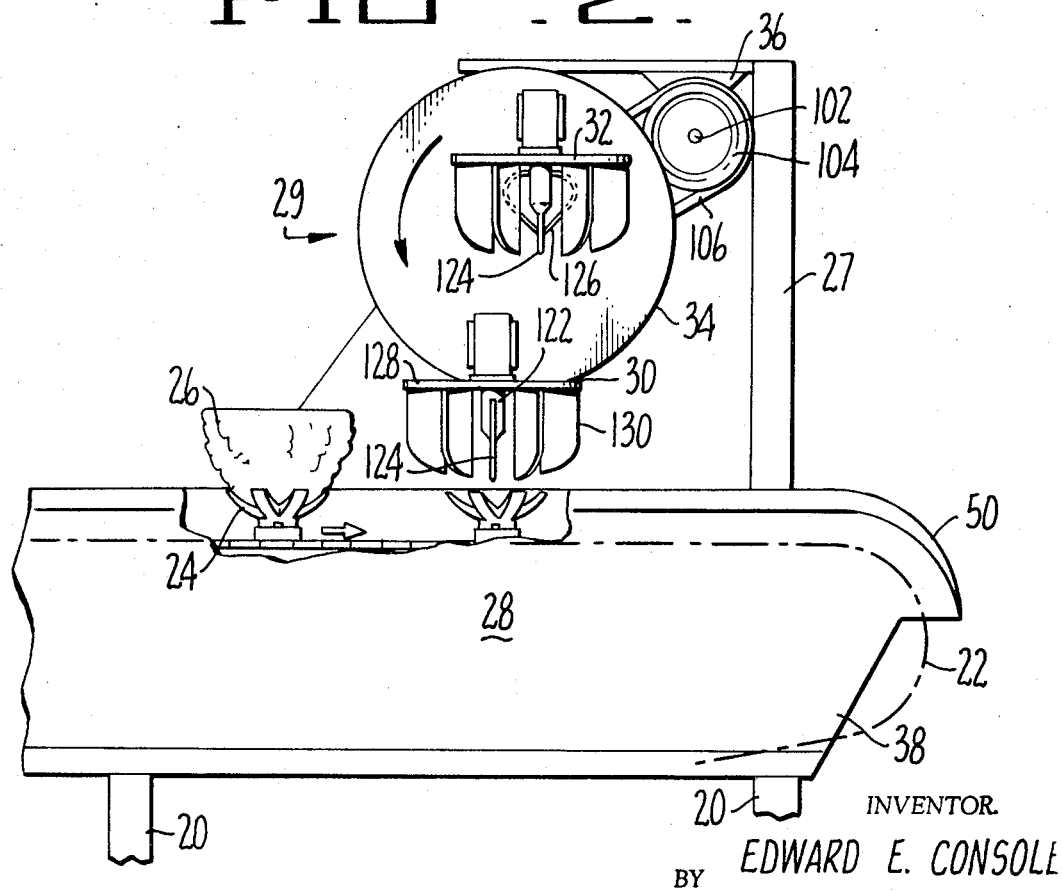
FIG. 1 is a side elevation view of an embodiment of apparatus according to the present invention.

Referring now to FIGS. 1 and 2, wherein partial side elevational and plan views, respectively, of the cauliflower coring and floreting machine according to one embodiment of the present invention are shown. A framework 20 resting on or fixedly attached to a floor (not shown) supports the apparatus that includes a horizontal endless conveyor belt 22 having a plurality of spaced apart cauliflower supporting cups 24 fixed thereto for carrying heads of cauliflower 26. The conveyor belt motion is toward the right in accordance with the arrows shown. A pair of sidewalls 38 having outward curving top portions 50 and 52 are disposed adjacent the length of the conveyor belt. The conveyor is driven by a shaft 40 journaled in a bearing 42 and having a drive gear 44 fixed thereto.

A coring and floreting assembly 29 is supported by an overhead support framework 27. Assembly 29 includes a pair of coring and floreting head assemblies 30 and 32 mounted on a counterclockwise (as viewed in FIG. 1) rotating vertical turntable 34. Head assemblies 30 and 32 are driven synchronously with the conveyor 22 to engage each succeeding cauliflower head carried by cups 24 at coring and floreting station 28. Turntable 34 has a variable speed drive to increase the time each head assembly is adjacent a cauliflower holding cup 24 by slowing the rotation speed during parts of the rotation cycle and to decrease the time between the raising of one head assembly and the lowering of the other head assembly by increasing the rotation speed during other parts of the rotation cycle. Head assemblies 30 and 32 are maintained in a vertical position, as shown in FIG. 1, throughout the full 360° revolution of turntable 34.

Each head assembly includes a rotating shaft 122 driven by a motor 36 via (in part) motor shaft 102, pulley 104 and belt 106. Shaft 122 includes a coring knife 124 at its tip and beater arms 126. A plurality of guide fins 130 are fixed to a circular plate 128. As explained in greater detail hereinafter, the guide fins 130 assist in breaking up and holding the cauliflower head while the rotating members core the cauliflower and break it into florets suitable for packaging.

Figure 3:
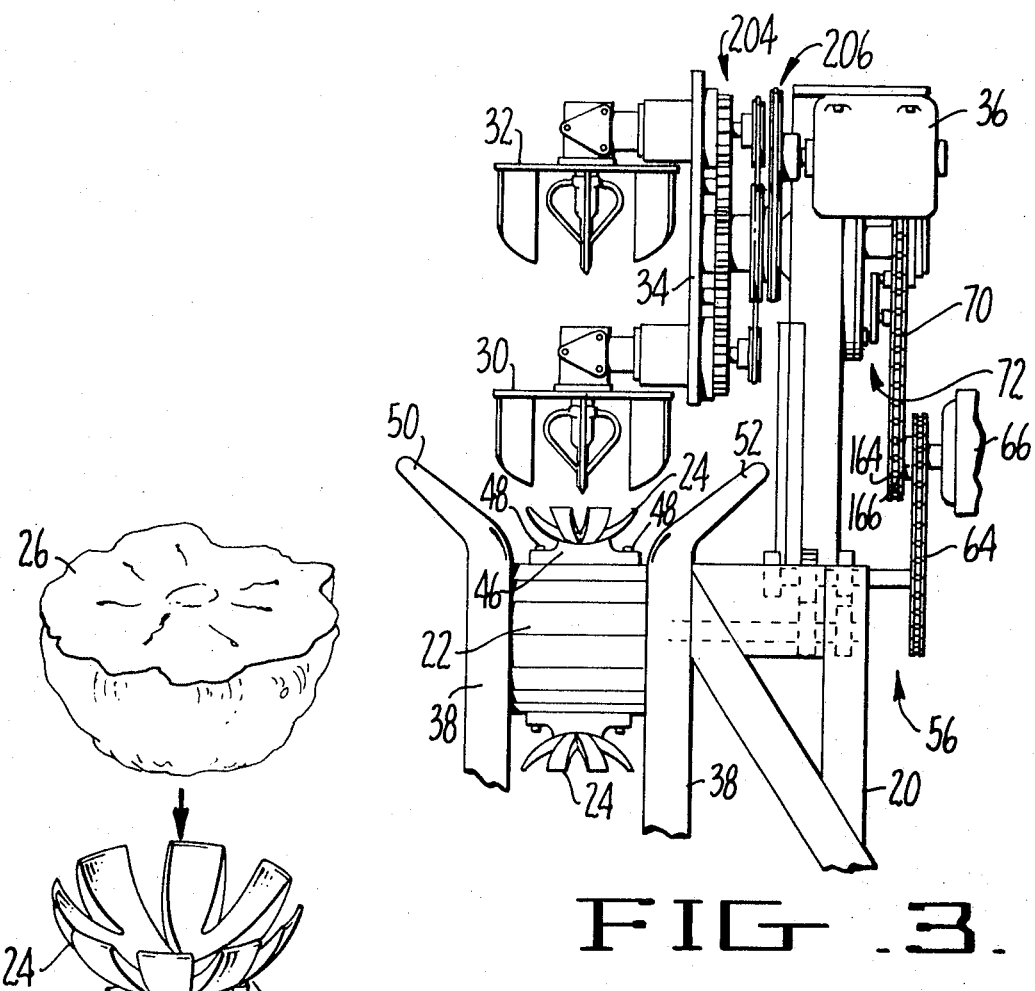
FIG. 3 is an end elevation view of the apparatus of FIG. 1.

FIG. 3 shows the apparatus in greater detail. A heavy duty constant speed motor 66 drives the conveyor 22 and the head assembly turntable 34. A double sprocket pulley 164 drives an endless chain 64 that powers the conveyor belt drive assembly 56 and also drives a further endless chain 70 that drives a cam assembly 72 for providing the variable speed drive to turntable 34. Head assembly motor 36 is connected to a coring and floreting head drive assembly 206. A head orientation gear assembly 204 provides vertical orientation of assemblies 30 and 32 as turntable 34 rotates. Further details of the aforementioned assemblies are given in connection with FIGS. 5–8.

Figure 4:
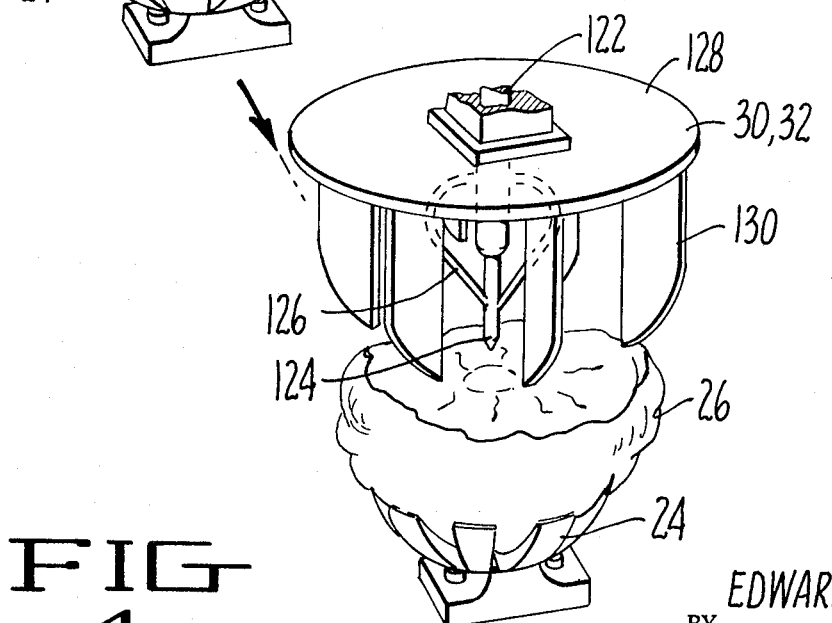
FIG. 4 is a perspective view illustrating the steps in processing cauliflower by the apparatus of FIG. 1.

FIG. 4 shows a cauliflower head 26 placed manually by an operator (not shown) onto a cauliflower holding cup 24. As the cup approaches the coring and floreting station, the head assembly 30, 32 comes into engagement with the cauliflower head. Guide fins 130 fit between the upright fingers of the holding cups 24 and hold the cauliflower from spinning out of the cup and may pierce the outer portions of a large head of cauliflower, assisting in floreting or breaking it up. Shaft 122 is rotating, carrying coring blade 124 and beater elements 126. As the head assembly 30, 32 drops downward, the coring knife enters the cauliflower to remove the core which is generally aligned with the knife axis due to the cauliflower head's positioning in cup 24. As the core is bored out, beater elements 126 tend to break up the cauliflower into florets chiefly along its natural sectioning in one single stroke operation. The floreted cauliflower pieces are carried along the conveyor 22 to the discharge end of the conveyor where they may be caught in containers or carried along a further conveyor belt (not shown). The cores tend to be reduced to pulp which is easily separated from the large floreted pieces of cauliflower.

Referring now to FIGS. 5–8, the details of the apparatus will be discussed. In order to simplify the explanation, the cutting blade drive, the cam drive, the cutting head orientation drive, and the conveyor drive will be treated seriatum.

CUTTING BLADE DRIVE

Figure 5:
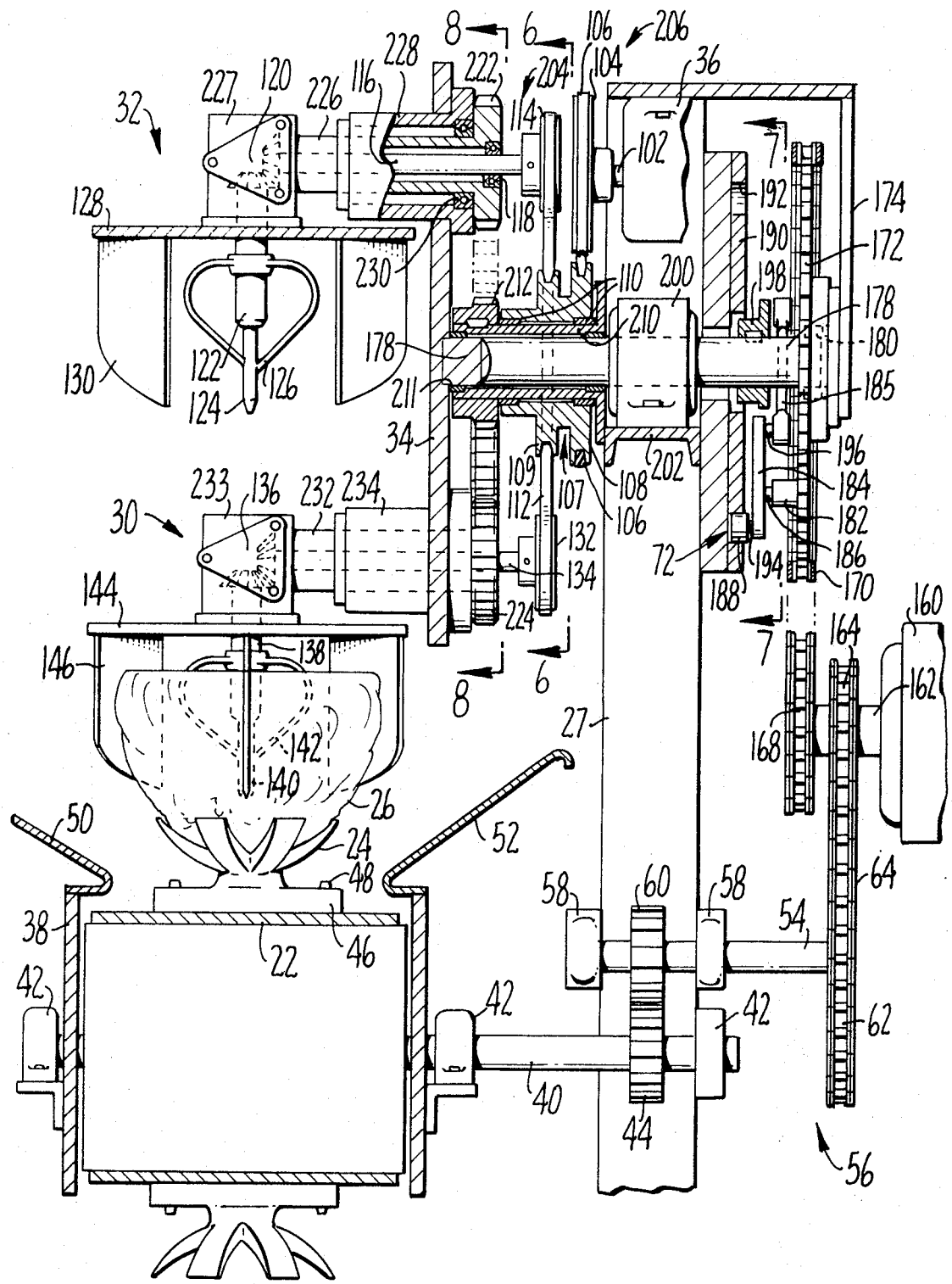
FIG. 5 is a more detailed end elevation view of the apparatus of FIG. 1.
Figure 6:
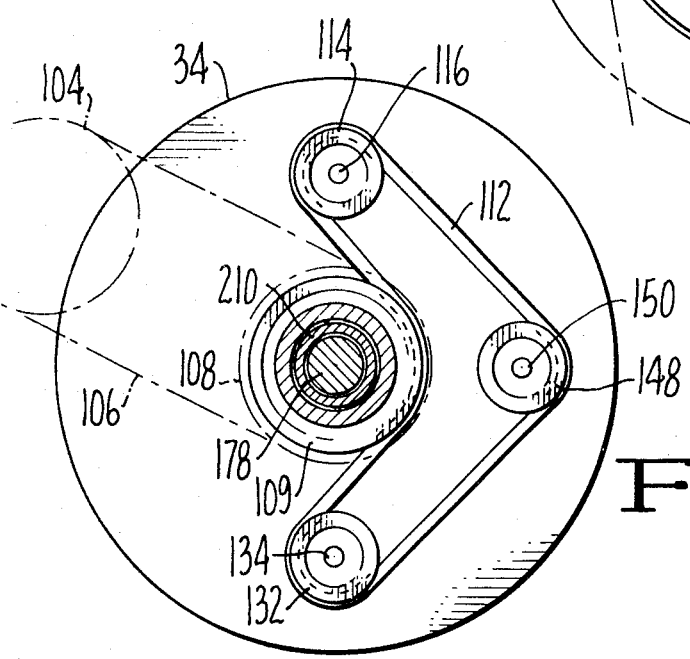
FIG. 6 is a cross-sectional view through section lines 6—6 of FIG. 5.

The cutting blade drive assembly is best understood with reference to FIGS. 5 and 6. Cutting blade motor 36 drives a belt 106 via drive shaft 102 and pulley 104. An input pulley 107 on a double pulley 108 receives the drive from belt 106. Pulley 108 is free turning on bearings 110 mounted on a fixed shaft 210. The output pulley 109 of double pulley 108 drives a belt 112 that drives three pulleys 114, 148 and 132. Pulley 148 is an idler pulley that turns freely on shaft 150 fixed to the turntable 34. Pulley 114 is fixed to a drive shaft 116 for head assembly 32 that is journaled in bearings 118 and passes through a sleeve 222 to a right angle gear drive 120 that drives shaft 122 having the coring blade 124 and beaters 126 fixed thereto. Pulley 132 is fixed to a drive shaft 134 for head assembly 30 that passes through sleeve 224 to a further right angle gear drive 136 that drives shaft 138 having coring blade 140 and beater 142 fixed thereto. The cutting blade drive is therefore independent of the turntable rotation.

CAM ASSEMBLY

Figure 7:
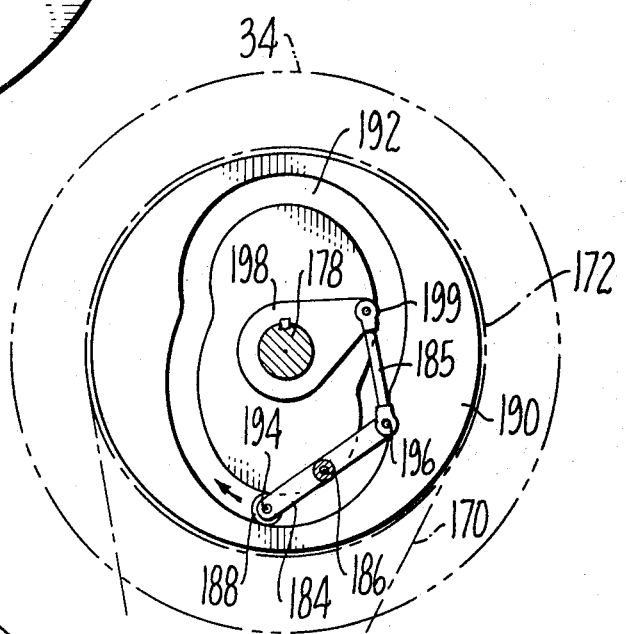
FIG. 7 is a cross-sectional view through section lines 7—7 of FIG. 5.

Referring now to FIGS. 5 and 7, the motor 160 drives both the cam assembly 72 and the conveyor belt assembly 56. Cam assembly 72 provides the variable speed drive to the turntable 34 via drive shaft 178. Nonslipping chain and sprocket drives and gear drives are used in the turntable and conveyor belt drive assemblies, hence the turntable and conveyor belt are driven in synchronism so that the cutting heads 30 and 32 will engage each cauliflower holding cup 24 as it passes the coring and floreting station 28 (see FIG. 1). If necessary, the gear drive ratios and holding cup spacings may be varied to achieve congruence of the rotating heads and the horizontally translating cups.

Motor 160 has a pair of sprocket drive pulleys 164 and 168 fixed to its drive shaft 162. An endless chain 170 from pulley 168 drives the cam drive sprocket pulley 172 at a constant speed. Pulley 172 is mounted on bearing 180 and rotates clockwise freely on shaft 178. Pulley 172 has a post 182 fixed to its sidewall and inset from its circumferential edge. A rocker arm 184 is pivoted at its center 186 on post 182. One end of rocker arm 184 is pivotally connected at 194 to a cam follower 188 and the other end is pivotally connected at 196 to a link arm 185. Link arm 185 is pivoted at 199 to an eccentric drive member 198 that is fixed to shaft 178. A cam 190 fixed to framework support 36 has a cam race 192 in which cam follower 188 rides in a clockwise direction. The cam race configuration is a modified figure "37 8" to cause shaft 178 to rotate faster during two parts of the full cycle when the next cutting and floreting assembly is to be brought into position.

Shaft 178 passes through a main support bearing 200 mounted on a support 202 in the framework 36. A hollow outer shaft 210 extends toward turntable 34 from bearing 200; shaft 210 is fixed to the bearing case and framework and does not rotate. Shaft 178 passes through shaft 210 and is fixed to turntable 34. Bearings 211 support shaft 178 adjacent the turntable. The orientation of shaft 178 with respect to drive member 198 is chosen so that the slower turntable rotation begins to occur as heads 30 and 32 have nearly reached an approaching cauliflower holding cup. Turntable 34 rotation speeds up as a head moves away from a cup. By moving the heads 30 and 32 more slowly in the 7 o'clock to 5 o'clock (rotation is counterclockwise as viewed in FIG. 1) positions, the heads track the continuous conveyor belt movement and permit the coring and floreting head to engage the cauliflower for a longer period of time to achieve more effective processing of the cauliflower. As the head moves away from the cup, the turntable is speeded up to rapidly bring the next head into position for the succeeding cup on the conveyor belt.

HEAD ORIENTATION ASSEMBLY

Figure 8:
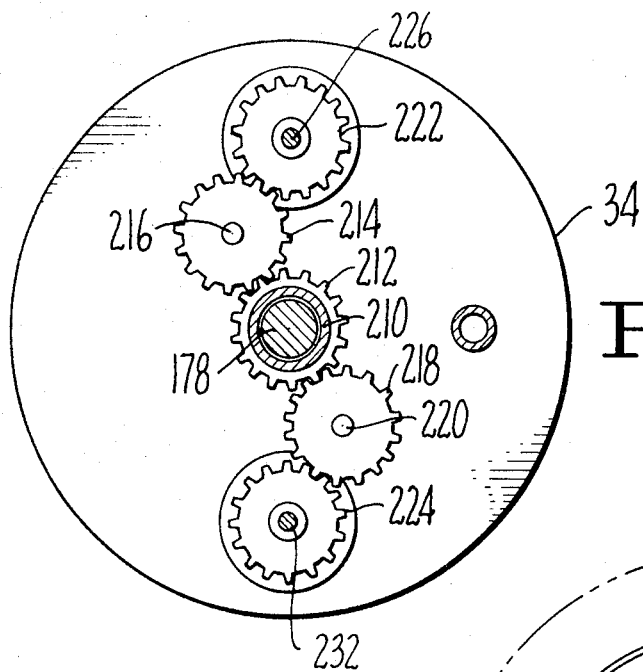
FIG. 8 is a cross-sectional view through section lines 8—8 of FIG. 5.

FIGS. 5 and 8 show in best detail the assembly for maintaining the vertical alignment of heads 30 and 32 throughout rotation of the turntable 34. Nonrotating support shaft 210 has a central gear 212 fixed thereto. A pair of free turning idler gears 214, mounted to turntable 34 on shaft 216, and 218, mounted to turntable 34 on shaft 220, mesh with central gear 212. A further set of gears 222 and 224 mesh with gears 214 and 218, respectively. Gear 222 is fixed to shaft 226 that is fixedly attached to the housing 227 for the right angle gear 120. Shaft 226 turns freely on bearings 230 within sleeve 228 that is fixed to turntable 34. Housing 227 is fixed to the circular plate 128 of head 32. In like manner, gear 224 is fixed to a shaft 232 that turns freely within sleeve 234 that is fixed to turntable 34. Shaft 232 is fixed to the housing 233 of the right angle gear 136 of head 30. The alignment of heads 30 and 32 is thus determined by gears 222 and 224 that relate to the fixed central gear 212. Thus, as the turntable rotates, the alignment of gears 222 and 224 (and consequently the heads 32 and 30 fixed thereto) remains the same with respect to the framework 27.

CONVEYOR BELT DRIVE ASSEMBLY

As mentioned above, motor 160 also drives the conveyor belt assembly 56. The second sprocket drive pulley 164 on motor drive shaft 162 drives an endless chain 64 to drive sprocket pulley 62 fixed to shaft 54. Shaft 54 is journaled in a pair of bearings 58 fixed to framework 27. A gear 60, fixed to the shaft 54, is located between the bearings 58 and drives the conveyor belt drive shaft 40 through gear 44 fixed thereto. Shaft 40 is journaled in bearing 42 on framework 36 and also in bearings 42 on either side of the conveyor belt sidewalls 38. The shaft 40 drives the conveyor belt in a conventional manner (not shown). Gears 44 and 60 may be altered to provide the desired conveyor belt drive speed as may be required to accommodate the rotation coring and floreting heads 30 and 32 on turntable 34. Also, the spacing between cups 24 on the conveyor belt may be varied to achieve proper engagement with the heads 30 and 32 if necessary.

It will be apparent to those of ordinary skill in the art that while the embodiment described herein employs a pair of cutting assemblies 30, 32 that apparatus embodying the principles of the invention could use one or several cutting assemblies disposed equidistantly around the periphery of turntable 34. Corresponding changes in the cam drive and other mechanisms would, of course, be made. Also, it will be recognized that the apparatus may have utiltity with produce other than cauliflower.

We claim:

1. Produce processing apparatus comprising
means for conveying produce along a predetermined path and for holding the produce as it is moved along said path to maintain the produce in predetermined position,
a cutting head assembly including a rotating shaft having a coring blade and beater arms fixed thereto,
rotating turntable means supported vertically above said predetermined path carrying said cutting head assembly for bringing said cutting head assembly into engagement with produce held by said conveying means as it moves along said path, and
means carried by said rotating turntable means for holding said produce relatively immovable with respect to said rotating shaft.

2. Apparatus according to claim 1 wherein said means for coring and breaking into florets further comprises a second cutting head assembly including a rotating shaft having a coring head and beater arms fixed thereto, said first and second cutting head assemblies disposed substantially 180° apart on said rotating turntable means.

3. Apparatus according to claim 2 wherein said rotating turntable means is driven at a slower speed when a cutting head assembly is near said conveyor means.

4. Apparatus according to claim 3 further comprising means for driving said rotating turntable means and said conveyor means in synchronism.

5. Apparatus according to claim 4 further comprising means for maintaining vertical orientation of said cutting head assemblies throughout the 360° rotation of said rotating turntable means.

6. Produce processing apparatus comprising
means for conveying produce along a predetermined path and for holding the produce as it is moved along said path to maintain the produce in predetermined position,
means engaging an article of produce as it moves along said path for coring said article of produce and breaking it into florets, said means for coring and breaking into florets including rotating turntable means supported vertically above said predetermined path, and a plurality of cutting head assemblies, each including a rotating shaft having a coring blade and beater arms fixed thereto, said assemblies disposed equidistantly around the periphery of said turntable means.

7. Apparatus according to claim 6 wherein said rotating turntable means is driven at a slower speed when a cutting head assembly is near said conveyor means.

* * * * *